(No Model.)
H. McLEOD.
FRICTION CLUTCH.
No. 573,689. Patented Dec. 22, 1896.
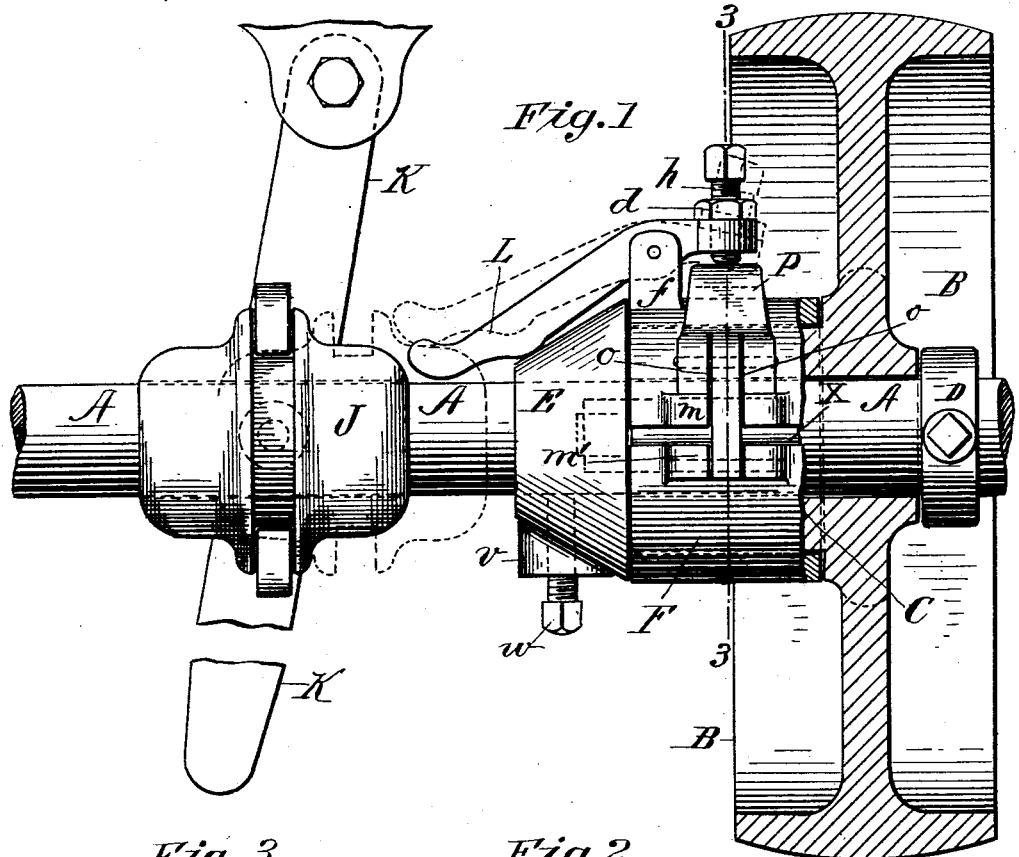
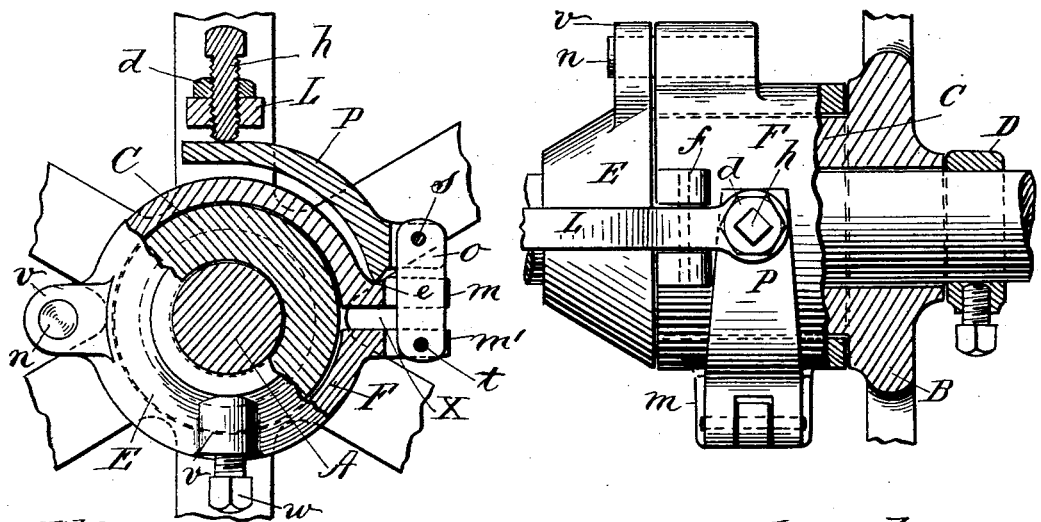
Witnesses:
J. H. Garfield
K. S. Clemons
Inventor,
Hugh McLeod,
by Chapin & Co.
Attorneys.
THE NORRIS PETERS CO., PHOTO-LITHO., WASHINGTON, D. C.

UNITED STATES PATENT OFFICE.

HUGH McLEOD, OF HATFIELD, MASSACHUSETTS.

FRICTION-CLUTCH.

SPECIFICATION forming part of Letters Patent No. 573,689, dated December 22, 1896.

Application filed June 4, 1896. Serial No. 594,284. (No model.)

*To all whom it may concern:*

Be it known that I, HUGH McLEOD, a citizen of the United States of America, residing at Hatfield, in the county of Hampshire and State of Massachusetts, have invented new and useful Improvements in Friction-Clutches, of which the following is a specification.

This invention relates to friction-clutches for use with shafting and pulleys, the object being to provide an improved clutch of this class of simple construction and possessing great gripping power; and the invention consists in the peculiar construction and arrangement of the operative elements of the clutch, all as hereinafter fully described, and more particularly pointed out in the claim.

In the drawings forming part of this specification, Figure 1 is a side view of a piece of shafting, a sectional view of a pulley on said shaft, and a side elevation of friction-clutch devices applied to said shaft and the hub of said pulley embodying my improvements, said figure showing a clutch-operating cone on said shaft and a shipping-lever for operating the same. Fig. 2 is a top plan view of said clutch and a portion of said pulley. Fig. 3 is a sectional view on line 3 3, Fig. 1.

In the drawings, A indicates a section of shafting, and B a pulley on said shaft, within the hub of which said shaft rotates freely, said pulley having a hub C thereon extending laterally therefrom upon said shaft. A collar D, of the usual type, is secured on said shaft, engaging one end of the pulley-hub to retain the pulley in place on the shaft. A second collar E is secured rigidly on said shaft at the outer extremity of said hub C by a set-screw $w$, or by other suitable means, on which collar is a laterally-projecting ear $v$, perforated to receive the end of a bolt $n$, below referred to. A hub-clamping broken ring F, preferably of cast metal, having fixed in one side thereof the said bolt $n$, engaging with said collar E, operatively occupies a position on the said hub C of the pulley B, but is bored to such internal diameter as permits it to rotate freely around said hub C, impelled by its said engagement with shaft A, through said collar E, which is connected to said hub, as described, and is fixed to said shaft by said set-screw $w$. As shown in Figs. 1 and 3 at $x$, the extremities of said broken ring F are separated more or less, and said separated extremities extend outwardly in parallel relations, as shown. Means, as below described, are provided connected with said ring extremities $m\,m'$, whereby upon the movement of said clutch-operating cone (indicated in Fig. 1 by J) by the shipping-lever K in one direction on shaft A the said extremities of said broken ring F are caused to approach each other, thereby springing the opposite sections of said ring with great force against said pulley-hub C therebetween, and thus frictionally engaging said hub, so that said pulley must rotate coincidingly with said broken ring. A movement of said shipping-lever in an opposite direction causes said broken-ring parts to spring apart and away from said pulley-hub, and the rotary movement of said pulley then ceases. The said broken clutch-ring-operating devices, intermediate of said sliding cone and said ring, consist of a lever P, whose short arm is in pivotal connection with said ring extremity $m'$ on said clutch-ring by means of two connecting-straps $o\,o$, said straps being pivoted to said extremity $m'$ by the pin $t$ and to said short arm of lever P by the pin $s$. Said last-named lever has a projection $e$ on its under side (see Fig. 3) which has a fulcrum bearing against the outer side of said ring extremity $m$. The free end of the long arm of said lever P extends outside of said ring F in curved form to about opposite the axial line of said shaft A. A lever L is pivoted to a stud $f$ on said ring F, the long arm of which extends therefrom to a position opposite the side of said shaft A in position to be engaged by said cone J to lift said long arm. The short arm of said lever L extends over said lever P, near its free end, and has an adjustable bearing thereagainst, consisting of a screw $h$, passing through said short arm. A jam-nut $d$ is provided on said screw $h$ for locking the same in any adjusted position. If said friction-ring F needs to have its grip upon the said hub C, which it incloses, increased or decreased, such adjustment is effected by turning said screw $h$ in the desired direction and then locking said screw by said nut $d$. The said bolt $n$, which extends through said ear $v$ on the said collar E and which extends into a stud on said friction-ring F, serves as a uniting element between said collar and friction-ring, whereby the latter is compelled to rotate coincidingly with said collar and the shaft A, which rotary motion is communicated to the pulley B when said lever L is operated, as described, by said cone J.

Having thus described my invention, what I claim, and desire to secure by Letters Patent, is—

A friction-clutch comprising the broken friction-ring F, combined with the collar E, said ring partially encircling said collar, and having outwardly-bent, parallel extremities, and means for securing said collar to a revoluble shaft, the lever P, having a pivotal connection with one extremity of said ring, and having a bearing on the opposite extremity thereof, the lever L, also pivoted on said ring, of which one arm thereof engages the free arm of said lever P, the pulley B, having a hub C, the shaft A, and shipper devices whereby vibratory movements are imparted to said lever L, substantially as set forth.

HUGH McLEOD.

Witnesses:
J. E. PORTER,
D. W. C. SCATES.